United States Patent
Bancroft et al.

(10) Patent No.: US 6,658,324 B2
(45) Date of Patent: Dec. 2, 2003

(54) PICK AND PLACE ROBOT SYSTEM

(75) Inventors: David Bancroft, Gilching (DE); Markus Kietzmann, Wolfratshausen (DE)

(73) Assignee: GPC Biotech AG, Munich (DE)

( * ) Notice: Subject to any disclaimer, the term of this patent is extended or adjusted under 35 U.S.C. 154(b) by 0 days.

(21) Appl. No.: 09/960,279

(22) Filed: Sep. 21, 2001

(65) Prior Publication Data
US 2002/0077725 A1 Jun. 20, 2002

Related U.S. Application Data
(60) Provisional application No. 60/236,517, filed on Sep. 29, 2000.

(51) Int. Cl.$^7$ .............................................. G06F 19/00
(52) U.S. Cl. ................ 700/245; 700/249; 700/250; 700/254; 700/255; 700/260; 700/261; 318/568.1; 318/568.2; 318/632; 701/23; 701/301; 414/737
(58) Field of Search .............................. 700/245, 254, 700/255, 250, 260, 261, 249; 318/568.1, 568.22, 632; 701/23, 301; 294/64.1, 65, 743, 100, 88; 414/751.1, 737; 198/468.2, 750.11, 476.1, 802; 324/158.1, 754; 29/740, 743, 834

(56) References Cited

U.S. PATENT DOCUMENTS

| | | | | |
|---|---|---|---|---|
| 4,759,124 A | * | 7/1988 | Snyder et al. ............... 29/834 |
| 4,824,633 A | | 4/1989 | Ichikawa et al. ........... 376/268 |
| 4,872,258 A | * | 10/1989 | Ragard ........................ 29/740 |
| 4,890,241 A | | 12/1989 | Hoffman et al. ............ 700/255 |
| 4,956,594 A | | 9/1990 | Mizuno et al. ........... 318/568.1 |
| 5,002,448 A | | 3/1991 | Kamijima et al. ............. 29/739 |
| 5,075,079 A | * | 12/1991 | Kerr et al. ..................... 422/64 |
| 5,227,717 A | * | 7/1993 | Tsurishima et al. .......... 324/754 |
| 5,247,608 A | | 9/1993 | Flemming et al. ........... 700/255 |
| 5,313,156 A | * | 5/1994 | Klug et al. ............... 324/158.1 |
| RE35,027 E | * | 8/1995 | Ragard ........................ 29/740 |
| 5,456,569 A | | 10/1995 | Cheatham et al. ......... 414/744.3 |
| 5,458,388 A | * | 10/1995 | Danek et al. ................ 294/100 |
| 5,762,081 A | * | 6/1998 | Keene et al. .................. 134/59 |
| 5,781,447 A | * | 7/1998 | Gerdes .......................... 716/15 |
| 5,807,522 A | | 9/1998 | Brown et al. .................. 422/50 |
| 5,836,323 A | * | 11/1998 | Keene et al. ............. 134/58 R |
| 5,843,767 A | | 12/1998 | Beattie ..................... 435/287.1 |
| 6,231,298 B1 | * | 5/2001 | Heston .................... 414/751.1 |

FOREIGN PATENT DOCUMENTS

| | | |
|---|---|---|
| EP | 0 189 573 A2 | 12/1985 |
| EP | 0206348 A2 | 6/1986 |
| EP | 0241883 A2 | 4/1987 |
| GB | 2 225 132 | 5/1990 |

OTHER PUBLICATIONS

Brussel et al. Programming, scheduling and control of flexible assembly systems, 1993, Journal A: vol. 33, No. 3,/Internet, pp. 8–17.*

Suckay et al., Automation of MALDI–TOF Analysis for Proteomics, 1999, Internet pp. 1–5.*

(List continued on next page.)

*Primary Examiner*—William A. Cuchlinski, Jr.
*Assistant Examiner*—McDieunel Marc
(74) *Attorney, Agent, or Firm*—Ropes & Gray LLP

(57) ABSTRACT

A plant is provided for rapid pick and place operations, enabling automated systems that return to at least one approximately fixed position to run faster than the rate of conventional systems. The plant utilises a novel combination of robotic design, linear motor technology, and control software. A system and method if provided for the rapid production of high-density arrays of biologically active substances.

62 Claims, 6 Drawing Sheets

OTHER PUBLICATIONS

Stevens et al., Automation of DNA purification using the platetrak automated microplate processing system, 2000, Internet, pp. 1–8.*

Stevens et al., Automation of DNA purification using the plate track automated microplate processing system, 2002, Internet. pp. 1–12.*

Maier, E. et al. Automated array technologies for gene expression profiling. *Drug Discovery Today* 2, 315–324 (Aug. 8, 1997).

Maier, E. et al., "Large–Scale Library Characterization." *Automation Technologies for Genome Characterization,* T. Beugelsdijk, ed., John Wiley & Sons 3, 65–88 (1996).

Meier–Ewert, S. et al. An automated approach to generating expressed sequence catalogues. *Nature* 361, 375–376 (Jan. 28, 1993).

Rose, S. D. Application of a Novel Microarraying System in Genomics Research and Drug Discovery. *JALA* 3, 53–56 (Jul. 1998).

Ross, M. T. et al. "High–Density Gridded YAC Filters: their Potential as Genome Mapping Tools." *Techniques for the Analysis of Complex Genomes,* Academic Press 8, 137–153 (1992).

Schober, A. et al. Accurate High–Speed Liquid Handling of Very Small Biological Samples. *BioTechniques* 15, 324–329 (1993).

Shalon, D. et al. A DNA Microarray System for Analyzing Complex DNA Samples Using Two–color Fluorescent Probe Hybridization. *Genome Research* 6, 639–645 (1996).

* cited by examiner

PICK AND PLACE ROBOT SYSTEM

RELATED APPLICATIONS

This application is based on U.S. Provisional Application No. 60/236,517, filed Sep. 29, 2000, which is hereby incorporated by reference in its entirety.

BACKGROUND OF THE INVENTION

The present invention relates to an improved plant for rapid pick and place operations, enabling automated systems that return to at least one approximately fixed position to run faster than the rate of conventional systems. The invention utilises a novel combination of robotic design, linear motor technology, and control software. The present invention further relates to a system and method for the rapid production of high-density arrays of biologically active substances.

Efficient automated systems are essential in many production processes, particularly where rapid yet accurate positioning is required for pick and place applications. For example the creation of high-density arrays of biologically active substances.

The generation of high-density arrays of biologically active substances has become an important process to assist many fields of biological research including molecular genetics and biology. Typically, a small amount of a biologically, biochemically, and/or chemically active substance, for example, nucleic acids, proteins, chemical compounds, viruses, or prokaryotic/eukaryotic cells, is transferred to a defined region on a solid carrier using an automated system. The use of an automated system allows very small regions (or spots) to be defined and generated. In this way, arrays of a multiplicity of biologically active substances can be generated at densities far greater than in the format in which the biologically active substances were stored. The substances can then be more efficiently investigated in this high density array format by a variety of physical, chemical or biological means. Such means include for example, fluorescent scanning, calorimetric reaction, ligand/anti-ligand reaction, nucleic acid hybridisation or cellular phenotype.

This approach has rapidly grown in importance and has generated a significant need for the production of many such arrays. Indeed, many research groups, academic institutions and commercial companies generate such arrays including for example, the RZPD (Germany), Clontech (USA), Research Genetics (USA), Genome Systems (USA) and Eurogentech (France).

These arrays are typically produced using a gantry robotic system carrying a transfer unit that samples (picks) one or more substances from a container and then deposits (places) the one or more substances at pre-defined positions on an appropriate carrier placed on the work surface of the robot. It is advantageous to produce many replicas of the arrays during this process, and hence the substance stored in the container may be sampled many times during the production run.

Workers skilled in the art have developed automated systems that have progressively increased the speed of these pick and place systems for the production of biological arrays. For example, Ross and co-workers (1992; In Techniques for the Analysis of Complex Genomes; Academic Press pp 137–153) described a high-density arraying robot that transferred 96 biological samples in parallel from a microtitre-plate container to a nylon filter substrate using 96 transfer pins.

An important development was the use of quadruple density microtitre plates (384 wells) and a corresponding set of 384 pins to transfer substances held in the microtitre plates (Meier-Ewert et al, 1993; Nature 254, 221–225). Recently, microtitre plates comprising 1536 wells have been produced (Greiner, Germany). However, certain biological systems (for example mammalian cell cultures) cannot be satisfactorily stored, processed or analysed at such densities, and for some applications it is necessary to use greater volumes that can be held within 1536-well (~10 $\mu$l volume per well) or even 384-well (~60 $\mu$l per well) microtitre plates.

As well known in the art, additional robotic developments have been made to further increase the speed of producing arrays of biologically, biochemically, and/or chemically active objects or substances. These include systems that can array over 860,000 spots in around three hours (Maier et al, 1996; In Automation Technologies for Genome Characterisation; Ed. Beugelsdijk; John Wiley & Sons pp 65–88), and the commercially available "Qbot" (Genetix, UK). The increase in speed has been achieved in these systems simply by increasing the average velocity of robotic motion while utilising a simple pin-transfer techniques that requires the work-tool carrying the transfer-pins to return to and resample from the microtitre plate before each deposition.

Simply increasing the average velocity of robotic motion generates further problems that must be overcome. For example, a typical simple-pin transfer unit ("spotting head") of a commercially available "Qbot" comprising 384 spotting pins has a mass of approximately 2 Kg, plus the approximately 40 Kg mass of the supporting drives which generate the motion of the transfer unit. Therefore, when travelling at a speed of 2 $ms^{-1}$, the inertial force (momentum) of the moving axis is approximately 90 $Kgms^{-1}$ and has a kinetic energy of about 180 J. On acceleration and deceleration, this momentum and energy must be generated and dissipated by the drives acting on the robot frame. If insufficient dissipation is provided within the robotic frame, the whole system will shake as the transfer unit is accelerated to and decelerated from high velocity, and may even move across the floor if not securely fixed. Such shaking prevents accurate positioning of the transfer unit until the whole machine has settled, which can take over half a second per movement, losing valuable machine-time when several tens of thousand movements must be made during a single run.

It is usual in the art to minimise this problem by designing the moving mass to be substantially less than the mass of the stationary frame. Indeed, this approach is conventional automation and engineering practice. However, in order to maintain sufficient system rigidity to ensure accurate and repeatable positional accuracy, the moving axes of most high-precision positioning robots have masses exceeding several tens of Kg. This requires that the mass of the corresponding stationary frame must be substantial if the moving mass is to be accelerated to velocities greater than 1 ms $^{-1}$. For example, the overall mass of the commercial Qbot (Genetix, UK) is close to 900 kg.

Although minimising the problem of momentum and energy dissipation, such a "light moving on heavy" strategy soon becomes impractical. For example, a hypothetical high-precision pick and place robot designed to reach velocities of over 4 $ms^{-1}$ will require a stationary mass approaching 3.5 to 5 tonnes in order to minimise positional instability due to inefficient momentum and energy dissipation. Such velocities are easily achievable using modem drive technologies. For example, Linear Drives Ltd (Essex, UK) provides a high-power small linear magnetic motor capable of providing over 400 N of peak force. Such a force is capable of accelerating a 50 kg mass from rest to 4 ms$^{-1}$ within 0.5 s over a distance of 1 m.

Transfer systems other than simple pin-transfer have been developed for array production, including those described by Schober and co-workers (1993; Biotechniques 15 324–329), Shalon and co-workers (1996; Genome Res. 6 639–645 and U.S. Pat. No. 5,807,522), Cartesian (USA) Genelogic (U.S. Pat. No. 5,843,767) and Genetic MicroSystems (Rose, 1998; JALA 3 No. 3. However, these systems typically have complicated and expensive control, cleaning, engineering or fluidic systems, reducing their applicability for high-throughput array production.

Despite the development of these novel transfer techniques, the vast majority of biological arrays are still produced using simple-pin transfer. The reliability, cost and reproducibility of simple-pin transfer to produce large numbers of arrays of biologically active substances have far outweighed the disadvantage of resampling from the sampling position before each transfer. However, the speed of transfer is limited by the overall mass of the arraying systems if they are to be used at the full speed provided by contemporary robotic drive technology.

SUMMARY OF THE INVENTION

The present invention provides a system for rapid pick and place applications, that may significantly increase the speed of such procedures, particularly the production of high-density arrays of biologically active substances.

DETAILED DESCRIPTION OF CERTAIN EMBODIMENTS OF THE INVENTION

Figure 1:
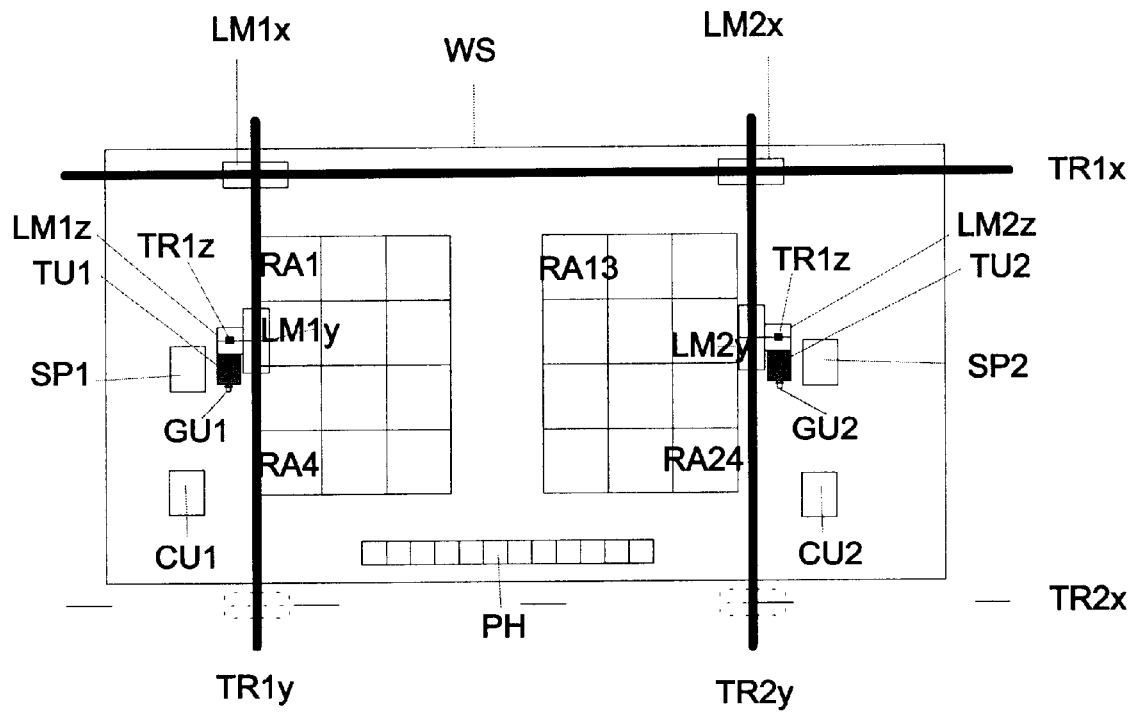
FIG. 1 shows a general arrangement of one embodiment of the invention that provides for improved production of high-density arrays of biologically active substances. A multi-axis gantry robot has access over a work surface (WS) that comprises replica arrays (RA1 to RA24), two sampling positions (SP1 and SP2) and two cleaning units (CU1 and CU2). Biologically active substances are stored in microtitre plate containers held in a plate hotel (PH), which can be automatically accessed using the grabbing units (GU1 and GU2) of the respective transfer units (TU1 and TU2). Using simple pin-transfer the transfer units sample (pick) substances from the microtitre plates and deposit (places) them onto the replica arrays to be produced. The motion of the transfer units is effected by linear magnetic motors (LMnn) obtaining thrust from magnetic flux means running on bearing means (TRnn).

In one aspect, the present invention provides a system for rapid pick and place operations including a multi-axis robot comprising at least one transfer unit, control means for controlling movement of the multi-axis robot; and means adapted to substantially level and/or cancel out inertial forces generated during acceleration and/or deceleration. Such systems may be located in a conditioning chamber and/or room In one embodiment, the present invention provides system for rapid pick and place operations, including a multi-axis robot comprising at least two transfer units and control means for controlling movement of the multi-axis robot, wherein the control means is adapted to control the movement of the transfer units such that inertial forces generated during acceleration and/or deceleration are substantially levelled and/or cancelled out.

In another embodiment, the invention provides a system for rapid pick and place operations, including at least two multi-axis robots, wherein each of the multi-axis robots comprises at least one transfer unit, and control means for controlling movement of the at least two multi-axis robots, wherein the control means is adapted to control the movement of the multi-axis robots such that inertial forces generated during acceleration and/or deceleration are substantially leveled and/or cancelled out.

In certain embodiments of the above systems, the control means is adapted to effect substantially simultaneous and oppositely directed movement of the transfer units and/or the multi-axis robots so that the overall motion profiles thereof substantially match with one another.

In certain embodiments of the above systems, the transfer units and/or the multi-axis robots are controlled to travel substantially the same distances for a given step in a pick and place cycle.

In certain embodiments of the above systems, the transfer units are moved by at least two interleaved multi-axis gantry robots or at least two arm-robots.

In certain embodiments of the above systems, the control means is adapted to effect independent movement of the multi-axis robot(s) with respect to all axes.

In certain embodiments of the above systems, the at least one transfer unit is moved by means of at least one linear motor within a multi-axis gantry robot. In certain such embodiments, each of the transfer units is moved by at least one separate linear motor running on common bearing means.

In certain embodiments of the above systems, the at least one transfer unit is moved by means of linear magnetic motors generating thrust using magnetic flux means and running on bearing means, wherein one or more of the bearing means can be provided in common for the transfer unit or separately.

In certain embodiments of the above systems, the at least one transfer unit is moved by two separate linear magnetic motors generating thrust using the same magnetic flux means and running on common bearing means.

In certain embodiments of the above systems, the transfer units have access to a work surface.

In certain embodiments of the above systems, the system transfers objects and/or substances. For example, the objects and/or substances may be biologically, biochemically or chemically active, such as nucleic acids, analogs of nucleic acids, proteins, peptides, analogs of proteins and/or peptides, small-molecules, viruses, prokaryotic cells and eukaryotic cells.

In certain embodiments of the above systems, the transfer unit comprises at least one pipette, micropipetting device, pin and/or pipette array, micropipetting device array or pin array.

In certain embodiments of the above systems, each transfer unit comprises at least one grabbing means.

In certain embodiments of the above systems, further comprising at least one separate sampling position for every the transfer units. In certain such embodiments, the sampling may be arranged physically distinct from the work surface. A sampling position may be, for example, a container or a multiwell container, which may be designed to be held in a container or multiwell container storage means accessible to the multiple axis robot(s).

In certain embodiments of the above systems, each multi-axis robot has access to at least one deposition position for depositing thereon the objects and/or substances, at least one sampling position and/or at least one cleaning unit. In certain such embodiments, at the deposition position distinct regions of transferred objects and/or substances are arranged at densities of 1 to 100, preferably 100 to 500, more preferably 500 to 1000, most preferably more than 1000 regions per square centimeter.

The systems of the invention as described above may further include inertial forces and/or kinetic energy absorbing means, such as one or more free-moving masses connected to the multi-axis robot(s) and/or work surface in such a way that any force acting on the multi-axis robot(s) and/or work surface also acts on the free-moving mass. In such embodiments, oscillations of the free-moving mass may be dampened to a sub-resonance frequency by a damping unit, which may comprise at least one gas, liquid and/or solid shock-absorbing unit. The free-moving mass may be a block of concrete suspended from at least one point and its oscillations may be dampened by at least one damping unit.

In another aspect, the present invention relates to a method for rapid pick and place operations by providing a multi-axis robot comprising at least one transfer unit, controlling the movement of the multi-axis robot, and substantially levelling out inertial forces generated during acceleration and/or deceleration.

In another embodiment, the present invention relates to a method for rapid pick and place operations by providing a multi-axis robot comprising at least two transfer units and controlling movement of the transfer units of the multi-axis robot such that inertial forces generated during acceleration and/or deceleration are substantially leveled out.

In another embodiment, the present invention relates to a method for rapid pick and place operations by providing at least two multi-axis robots, wherein each of the multi-axis robots comprises at least one transfer unit, and controlling movement of the multi-axis robot and/or their transfer units such that inertial forces generated during acceleration and/or deceleration are substantially leveled out.

In certain embodiments of the methods set forth above, the controlling step further comprises effecting substantially simultaneous and oppositely directed movement of the transfer units and/or the multi-axis robots so that the overall motion profiles thereof substantially match with one another.

In certain embodiments of the methods set forth above, the transfer units and/or the multi-axis robots are controlled to travel substantially the same distances for a given step in a pick and place cycle.

In certain embodiments of the methods set forth above, the transfer units are carried by at least two interleaved multi-axis gantry robots or at least two arm-robots.

In certain embodiments of the methods set forth above, the controlling step further comprises effecting independent movement of the multi-axis robot(s) with respect to all axis.

In certain embodiments of the methods set forth above, the at least one transfer unit is moved by means of at least one linear motor within a multi-axis gantry robot.

In certain embodiments of the methods set forth above, each of the transfer units is moved by at least one separate linear motor running on a common bearing means.

In certain embodiments of the methods set forth above, the at least one transfer unit is moved by means of linear magnetic motors generating thrust using magnetic flux means and running on bearing means, wherein one or more of the bearing means can be provided in common for the transfer unit or separately.

In certain embodiments of the methods set forth above, the at least one transfer unit is moved by two separate linear magnetic motors generating thrust using the same magnetic flux means and running on a common bearing means.

In certain embodiments of the methods set forth above, the transfer units have access to a work surface.

In certain embodiments of the methods set forth above, the method is used to transfer objects and/or substances. For example, the objects and/or substances may be biologically, biochemically or chemically active, such as nucleic acids, analogs of nucleic acids, proteins, peptides, analogs of proteins and/or peptides, small molecules (i.e., organic compounds having a molecular weight less than about 2000 amu, preferably less than about 1500 amu, even more preferably less than about 1000 amu), viruses, prokaryotic cells, and eukaryotic cells.

In certain embodiments of the methods set forth above, the transfer unit provides at least one pipette, micropipetting device, pin and/or pipette array, micropipetting device array or pin array.

In certain embodiments of the methods set forth above, each transfer unit comprises at least one grabbing means.

In certain embodiments of the methods set forth above, the method also includes providing at least one separate sampling position for every the transfer units, which may, for example, be arranged physically distinct from the work surface. In certain such embodiments, at least one of the sampling positions comprises at least one container, such as a multiwell container, which may optionally be designed to be held in a container or multiwell container storage means accessible to the multi-axis robot.

In certain embodiments of the methods set forth above, the work surface comprises at least one deposition position for depositing thereon the objects and/or substances, at least one sampling position and/or at least one cleaning unit. In certain such embodiments, at the deposition position distinct regions of transferred objects and/or substances are arranged at densities of 1 to 100, preferably 100 to 500, more preferably 500 to 1000, most preferably more than 1000 regions per square centimeter, each of which may be visited multiple times during the production of the arrangement, each time carrying a further sample of objects and/or substances.

In certain embodiments of the methods set forth above, the method further includes providing inertial forces and/or kinetic energy absorbing means, such as at least one free-moving mass connected to the multi-axis robot(s) and/or work surface in such a way that any force acting on the multi-axis robot(s) and/or work surface also acts on the free-moving mass. Oscillations of a free-moving mass may be dampened to a sub-resonance frequency by at least one dampening unit such as at least one gas, liquid and/or solid shock-absorbing unit. For example, at least one block of concrete suspended from at least one point may be employed as a free-moving mass, and its oscillations may be dampened by at least one damping unit.

In certain embodiments of the methods set forth above, the method is carried out in a conditioning chamber and/or room.

In yet another aspect, the invention provides a computer program product directly loadable with the internal memory of the a digital computer, comprising software code portions for performing the steps of a method set forth above when the product is run on a computer.

In another embodiment, the invention provides a computer program product stored on a computer usable medium, including computer readable program means for causing a computer to control movement of a multi-axis robot comprising at least one transfer unit, and computer readable program means for causing the computer to control the substantially levelling and/or cancelling out of inertial forces generated during acceleration and/or deceleration.

The present invention further contemplates distribution of such a computer program product, e.g., on a computer readable storage medium sent by mail or courier, or electronically over a network such as the Internet.

Exemplification

Example 1

Example 1 describes a spotting robot with increased speed for the production of high-density arrays of biologically active substances, wherein the increased speed is achieved by simultaneous movements of two transfer units in opposite directions, effectively compensating forces generated within the system.

The general arrangement of an improved spotting robot for the production of high-density arrays is shown in FIG. 1. The arrangement according to Example 1 of the present invention essentially comprises a large work surface (WS) on which replica arrays (RA1 to RA24) are produced by accurate positioning of pin transfer units (TU1 and TU2) which respectively sample (pick) biological material held in 384-well microtitre plate containers at sampling position (SP1 and SP2). A first transfer unit (TU1) is positioned using a three axis gantry robot consisting of linear magnetic motor units (Linear Drives Ltd UK)—one for each dimension of motion—(LM1$x$, LM1$y$ and LM1$z$), each running on a bearing and magnetic thrust rod arrangement (TR1$x$, TR1$y$ and TR1$z$). A second transfer unit (TU2) is positioned using three linear motor units (LM2$x$, LM2$y$ and LM2$z$). Linear magnetic motors (LM2$y$) and (LM2$z$) run on separate bearing and thrust rod arrangements (TR2$y$ and TR2$z$), while linear motor (LM2$x$) runs on the same bearing and thrust rod arrangement (TR1$x$) as linear motor (LM1$x$). It should be recognised, that a second pair of major drive motors (X axis) may be utilised on a further parallel trust-rod and bearing arrangement (TR2$x$) in order to provide for further speed and positional accuracy of each transfer unit.

An advantageous feature of linear magnetic motors such as those supplied by Linear Drives Ltd (Essex, UK) is that more than one motor unit can travel on the same thrust-rod and bearing arrangement. The positions of the multiple motor units are recorded and controlled using an encoder communicating to an appropriate multi-axis servo-controller. The use of such multi-motor linear drive technology enables both transfer units to be used within the same work-envelope over the replica arrays. However, it will be recognised by a person skilled in the art following this disclosure of invention that similar solutions may be effected using other linear motion robotics. These include for example, independent worm-drive or belt linear motors configured in the X-axis, each positioning a separate transfer unit. Instead of gantry robots two appropriate multi-axis arm robots (Beckman, USA; Mitsubishi, Japan) may also be used to effect the motion of the two transfer units over the work surface. The two linear motors or two arm robots are positioned next to or above/below of each other, or positioned on either side of the work surface.

Samples for transfer are stored in 384-well microtitre plates held in a plate hotel (PH) positioned to one side of the system. Individual plates can be automatically accessed in the plate hotel and placed on either of the sampling positions (SP1 or SP2) by the grabbing units (GU1 and GU2) of the respective transfer units.

Figure 2:
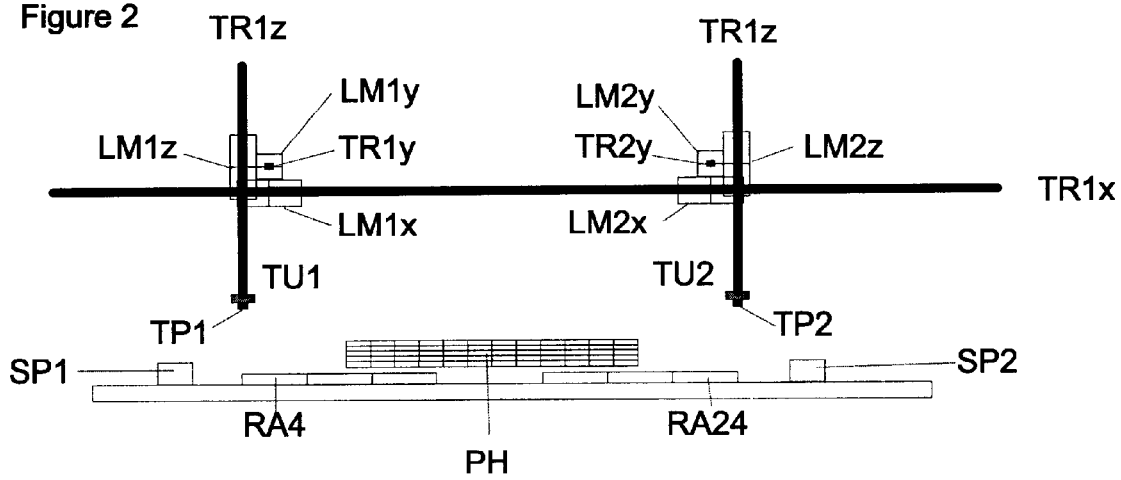
FIG. 2 illustrates a side elevation of the embodiment shown in FIG. 1. The transfer of biologically active substances from microtitre plate containers held at the sampling positions to the replica arrays is effected using transfer pins (TP1 and TP2) carried by the transfer units (TU1 and TU2), respectively.
Figure 3:
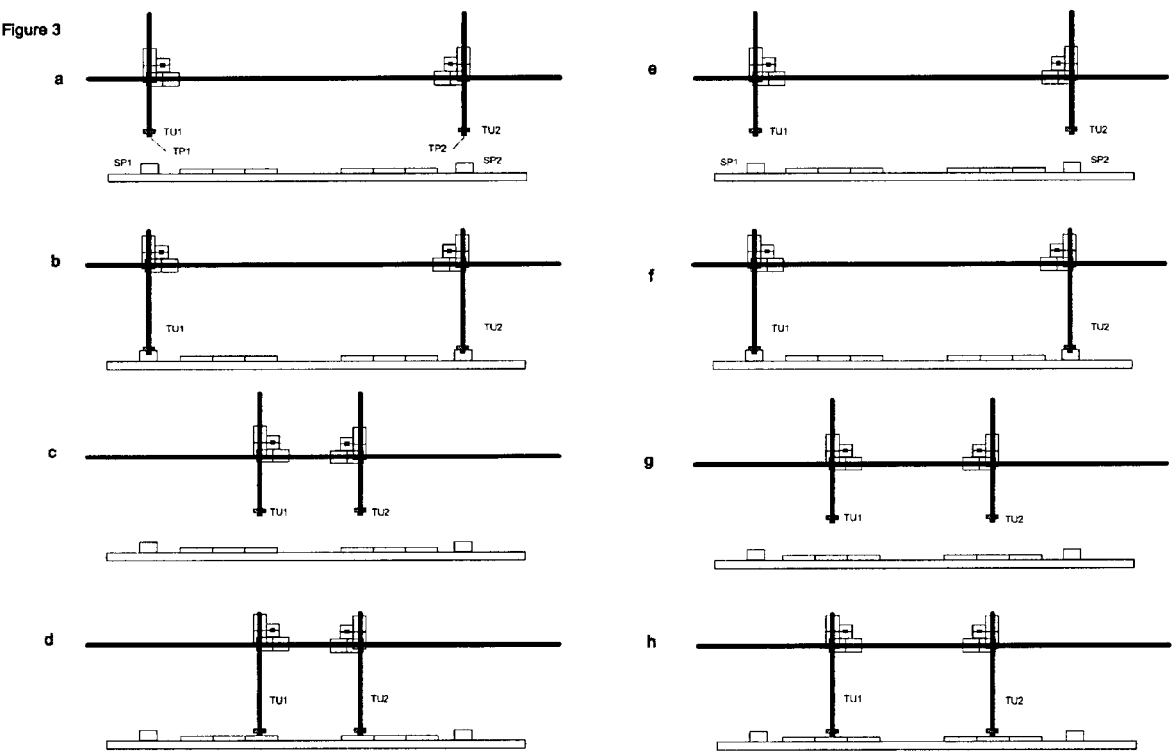
FIG. 3 shows a simultaneous action of the two transfer units (TU1 and TU2) according to the invention.

FIG. 2 displays a side view of one embodiment of the invention. When all samples have been transferred to appropriate replica arrays from two given microtitre plates, the 2-dimensional array of 384 transfer pins (TP1 and TP2) carried by each transfer unit are cleaned in a respective cleaning unit (CU1 and CU2). The microtitre plates are then replaced in the plate hotel and further microtitre plates are automatically accessed. It is adventagous if each plate in the plate hotel is accessible by either of the grabbing units of the transfer units.

The invention provides for an improved speed of array production by following a cycle of spotting (pick and place) movements using the two transfer units simultaneously. By the use of both transfer units substantially simultaneously, an increase of the overall spotting speed can be achieved from a single pick and place system, since the momentum of one moving part of the system compensates the inertial force (momentum) of the other part moving in the other direction. In this way, the robot frame has to dissipate zero momentum and can therefore be substantially lighter or more advantageously the moving parts can be co-accelerated to substantially higher velocities for a given robot frame.

First, two desired microtitre plates containing biologically active substances to be arrayed are automatically accessed from the plate hotel and placed into each of the two sampling positions using the grabbing units of the respective transfer units.

Figure 3A:
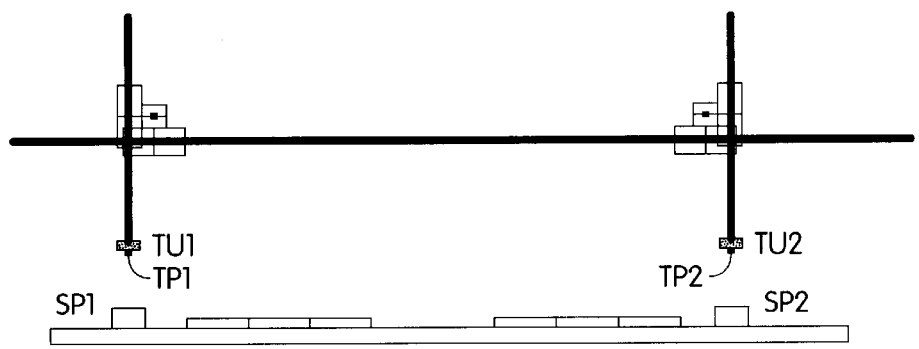

Second, the spotting cycle begins with both transfer units positioned above their respective sampling position (FIG. 3a).

Figure 3B:
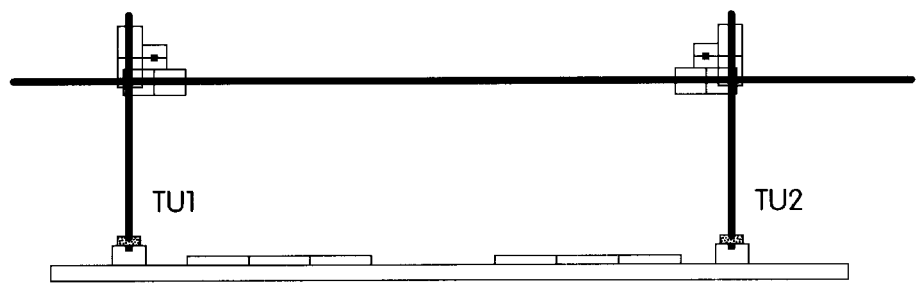

Third, the first transfer unit (TU1) samples (picks) from the first sampling position (SP1) by dipping pins (TP1) into the wells of the microtitre plate as the pins (TP2) of the second transfer unit (TU2) sample (pick) from the microtitre plate held at the second sampling position (SP2); see FIG. 3b.

Figure 3C:
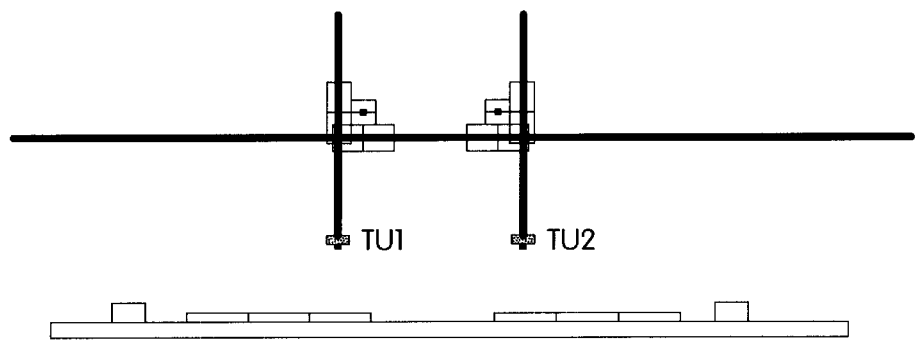
Figure 3D:
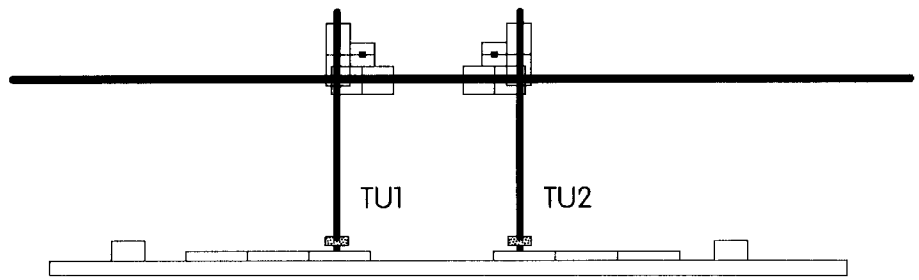
Figure 3E:
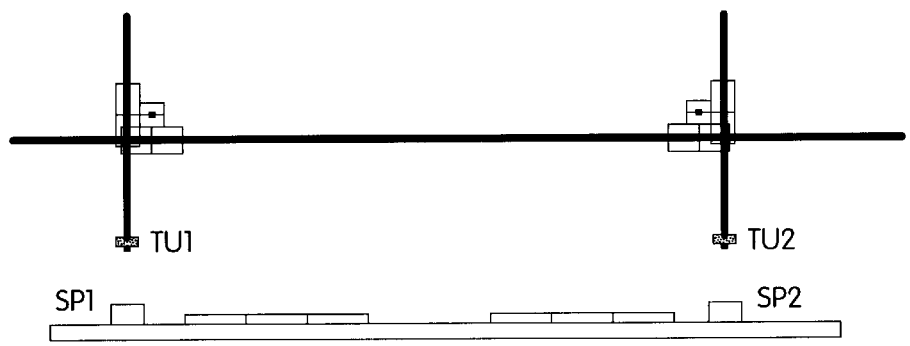

Fourth, both transfer units (TU1 and TU2) move to positions above that to which the substances are to be arrayed (FIG. 3c) and then deposit (place) the substances carried by the respective transfer pins onto two replica arrays (FIG. 3d). Both transfer units (TU1 and TU2) then return to positions above the sampling positions (SP1 and SP2), respectively (FIG. 3e).

Figure 3F:
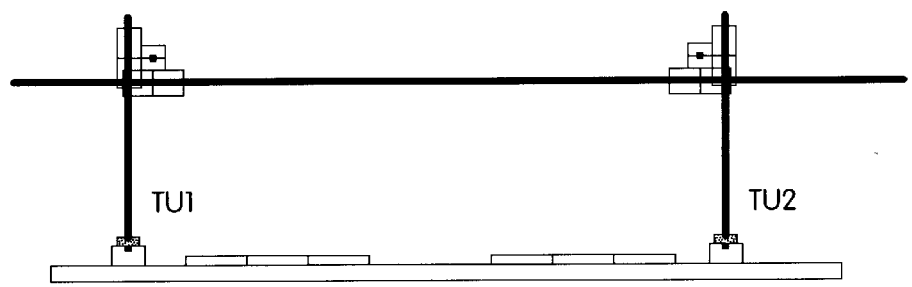
Figure 3G:
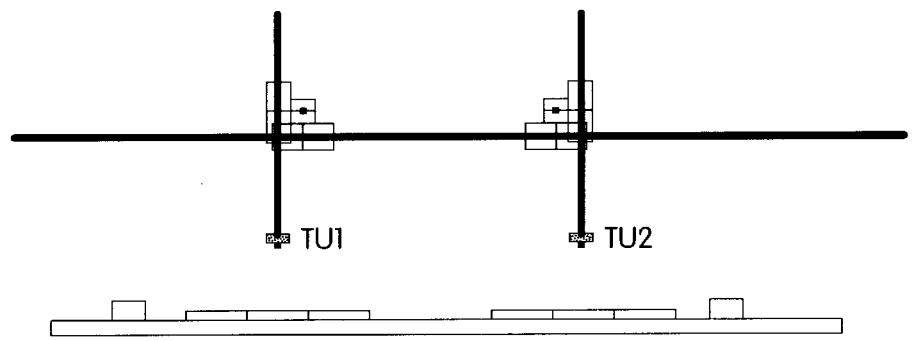
Figure 3H:
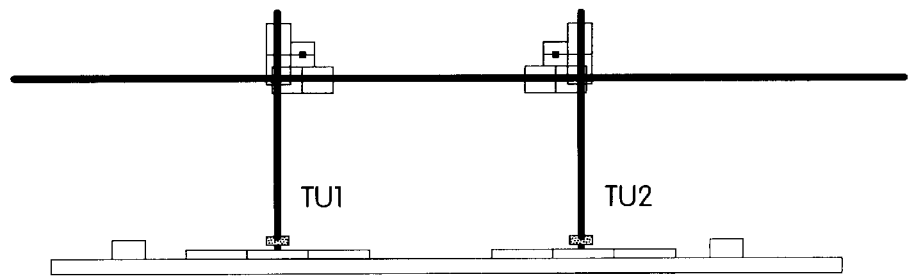

Fifth, both transfer units (TU1 and TU2) then sample (pick) further biological substances from the respective microtitre plates (FIG. 3f). The transfer units (TU1 and TU2) then move to positions above the next two replica arrays (FIG. 3g), and deposit (place) the substances carried by the pins (TP1 and TP2) onto these replica arrays (FIG. 3h).

This basic cycle is repeated until all samples in both microtitre plates have been transferred to all replica arrays accessible to a given transfer unit. The pins of each transfer unit are cleaned using cleaning units (CU1 and CU2), respectively, and the microtitre plates are then automatically replaced in the plate hotel and optionally exchanged between transfer units such that the plate previously held at the first sampling position (SP1) is now held at the second sampling position (SP2) and visa versa. Alternatively, other microtitre plates may be taken from the plate hotel to provide for further biological substances to be arrayed without user intervention. Such arrays may be generated at densities between 1 and 10,000 substances per square centimeter and be arrayed on various substrate carriers (Maier, E. et al 1997 Drug Discovery Today 2, 315–324). The carriers may for example, be microtitre plates, porous or non-porous surfaces or growth medium. The use of a system as characterised by the invention provides for 24 replica arrays carrying over 55,000 biologically active substances to be made in around 2 hours. Conventional systems, like the "Qbot", would require at least double the time.

The optimum speed and reliability of array production using the design of the invention is achieved by using appropriate software to control the simultaneous motion of the dual transfer units.

Figure 4:
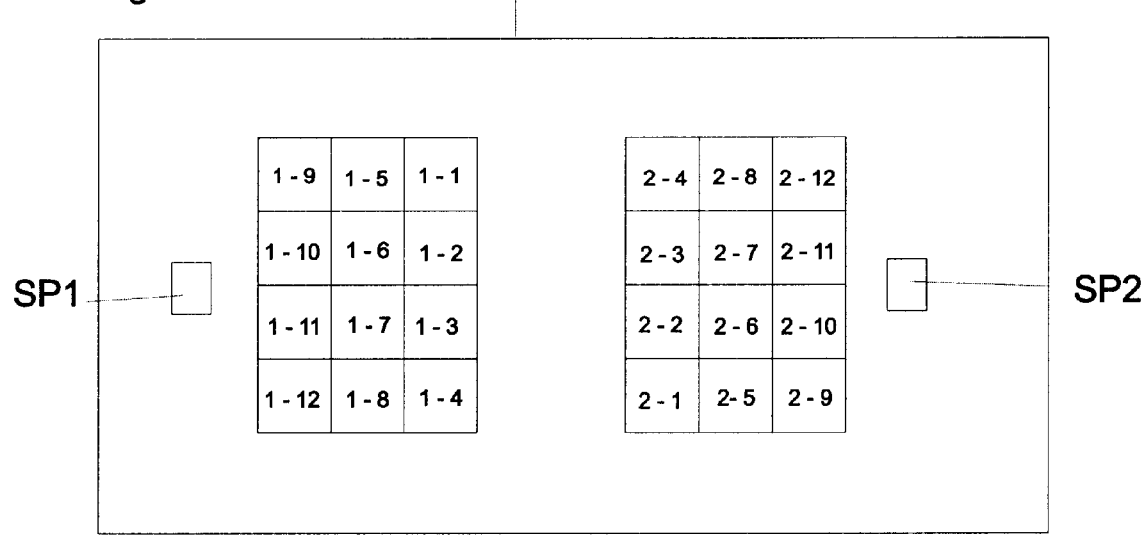
FIG. 4 represents an order for production of replica arrays that utilises the dual transfer units of the invention. A first transfer unit initially deposits (places) samples on an array marked "1-1" and a second transfer unit first deposits (places) samples on an array marked "2-1". The first transfer unit then deposits (places) samples onto an array marked "1-2" and the second transfer unit then deposits (places) samples onto an array marked "2-2", etc. The order of array production is such that the two transfer units travel approximately similar distances and in opposite directions.

First, it is advantageous that the order in which the replica arrays are accessed by the two transfer units is such that each transfer unit travels approximately similar distances and in opposite directions. For example, FIG. 4 shows one such order of access for the two transfer units when accessing all 24 replica arrays.

Second, although the two transfer units travel approximately similar distances and opposite directions for each move, the speed and timing of motion for each transfer unit must be controlled such that the start and finish of motion occur at effectively the same time. For example, by programming a multi-axis/multi-co-ordinate system servo controller such as the Delta Tau PMAC 2 (Delta Tau, USA), appropriate check flags reporting the start and finish of synchronous motion can be provided. Further, the required motion profile of a given transfer unit can be calculated so that total travel time is essentially identical for each transfer unit. For example, total motion-travel times can be calculated by an appropriate program in the servo-controller and then used to set the acceleration and speed profiles for each transfer unit using the appropriate commands of the servo-controller. The servo controller then ensures that these profiles are matched by automatically increasing or decreasing the appropriate gains and velocities for the appropriate motor such that the transfer units start and stop their motion effectively simultaneously, and that the overall motion profile of each transfer unit is matched and opposite. It is preferred that the servo controller is programmed to control a 6 dimensional vector move, where each dimension is an axis of motion for one of the two transfer units.

Third, it is advantageous that the transfer units or Y-axes are prevented from colliding. For example, by using the 'PLCO' program of a Delta Tau PMAC 2 servo controller, the actual positions of the two transfer units and/or axes can be actively monitored. Using this program feature, the actual positions of all axes are constantly compared, and the system can instantaneously respond or be halted by the program automatically issuing an appropriate command if the axes come within a pre-defined distance of each other.

Example 2

Example 2 describes a spotting robot with increased speed for the production of high-density arrays of biologically active substances, wherein the increased speed is achieved by an improved dissipation of the energy generated within the system.

Figure 7:
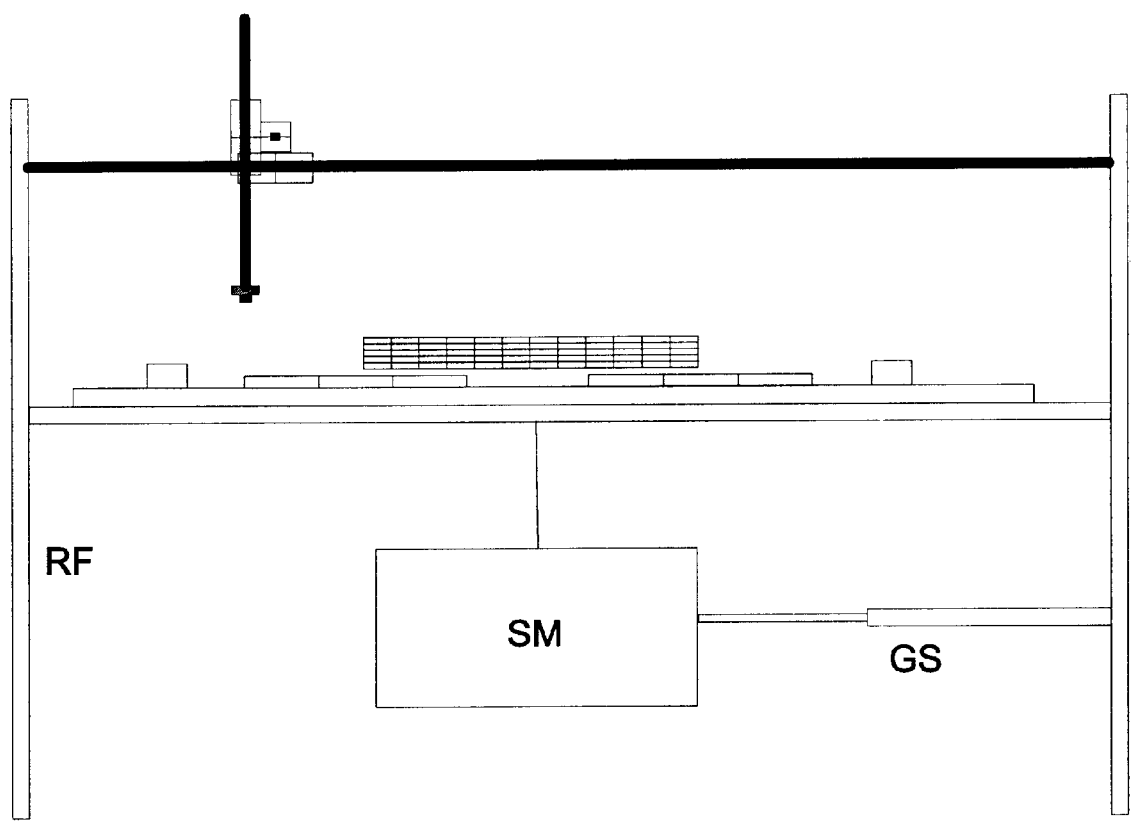
FIG. 7 shows an arrangement for a robot comprising a kinetic energy absorbing means comprising a heavy swinging mass (SM), which is suspended from and under the robot frame (RF). The swinging mass (SM) is damped by a gas-shock absorber unit (GS), positioned to damp oscillations in the major axis of momentum.

A side elevation of a robot designed to provide for improved dissipation of energy and hence reduce the problem of frame-shake is shown in FIG. 7. Kinetic energy of the moving mass is transferred to a heavy swinging mass (SM) suspended from and under the robot frame (RF). The swinging heavy mass can for example, be a block of concrete suspended from a strong chain. Rapid acceleration and deceleration of the transfer unit is now achievable since the energy transferred to and from the frame is absorbed by the swinging mass. Any oscillation in the swinging mass is dampened by the use of at least one gas-shock absorber (GS), preferable positioned to damp oscillations in all axis of momentum.

Example 3

Figure 5:
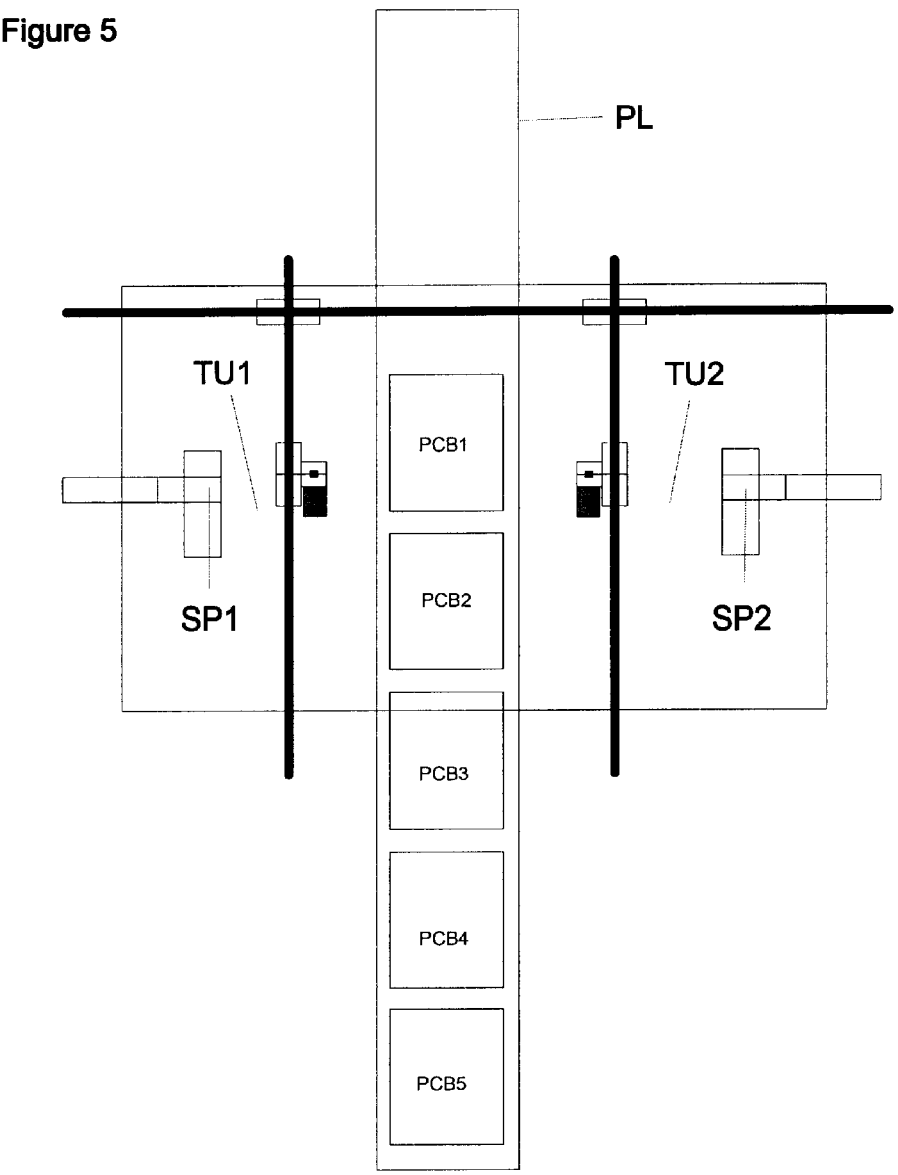
FIG. 5 shows an arrangement for a gantry robot with two transfer units (TU1 and TU2) adapted to move substantially simultaneously to transfer electronic components from two sampling positions (SP1 and SP2) respectively onto printed circuit boards moved into and out of the system by production line (PL).
Figure 6:
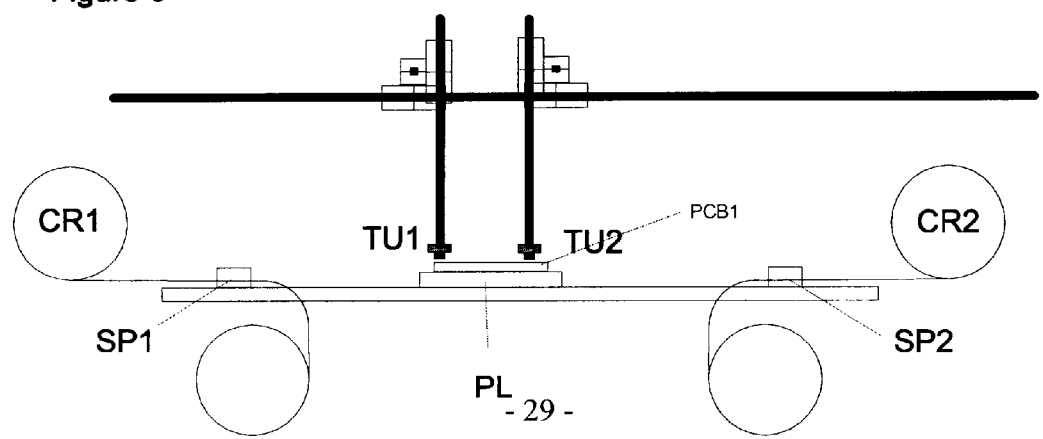
FIG. 6 depicts one stage of the pick-and-place cycle shown by a side elevation of the system shown in FIG. 5. The transfer units (TU1 and TU2) collect (pick) a component delivered to sampling positions (SP1 and SP2) by component-reels (CR1 and CR2). Then the two transfer units simultaneously insert the components into a first printed circuit board (PCB 1).

This example relates to the improved automated insertion of electronic components into printed circuit boards The general arrangement of an improved system for the automated insertion of electronic components into printed circuits boards (PCBs) is shown in FIG. 5. According to this embodiment of the invention the plant generally comprises a production line or transport unit (PL) on which replica printed circuit boards (PCB1 to PCB5) are moved into and out of the system and two sampling positions (SP1 and SP2) from which electronic components are automatically delivered by independent transport units. For example, resistors stored within a plastic component-reel, as well known in the art, are delivered to a first sampling position (SP1), while diodes are likewise delivered to a second sampling position (SP2). Two transfer units (TU1 and TU2) that can be independently positioned and comprise appropriate work-tools, collect (pick) electronic components from the respective sample points and insert (place) them into the replica PCBs. The independent motion, positioning and control of two transfer units are effected by linear magnetic motors (Linear Drives, UK), linear or arm robots as described above.

The transfer units (TU1 and TU2) are utilised simultaneously in a manner similar to that disclosed in Example 1.

Electronic components are delivered to the first and second sampling positions (SP1 and SP2) by component-reels (CR1 and CR2), and are collected (picked) by transfer units (TU1 and TU2), respectively. The first and second transfer units (TU1 and TU2) then move substantially simultaneously and oppositely matched to insert (place) the collected components into PCB1 (FIG. 7) When all required components of the types delivered by both component-reels (CR1 and CR2) have been inserted into PCB1, PCB2 is automatically positioned within the system by the production line (PL), and the cycle is repeated.

The control software and control of positional variability between transfer units as disclosed in Example 1 will be applicable to this embodiment of the invention.

All references to patents, articles, and other publications cited herein, including GB 2225132, EP 189573, and U.S. Pat. Nos. 5,247,608, 5,002,448, 4,890,241, and 4,824,633, are hereby incorporated by reference in their entirety.

Those skilled in the art will recognize, or be able to ascertain using no more than routine experimentation, numerous equivalents to the compounds and methods of use thereof described herein. Such equivalents are considered to be within the scope of this invention and are covered by the following claims.

We claim:

1. A system for rapid pick and place operations, comprising:
   (a) a multi-axis robot comprising at least two transfer units; and
   (b) control means for controlling movement of the multi-axis robot;
   wherein the control means controls the movement of the transfer units such that inertial forces generated during acceleration and/or deceleration are substantially eliminated.

2. A system for rapid pick and place operations, comprising:
   (a) at least two multi-axis robots, wherein each of the multi-axis robots comprises at least one transfer unit; and
   (b) control means for controlling movement of the at least two multi-axis robots;
   wherein the control means controls the movement of the multi-axis robots such that inertial forces generated during acceleration and/or deceleration are substantially eliminated.

3. The system of claim 1 or 2, wherein the control means effects substantially simultaneous and oppositely directed movement of the transfer units and/or the multi-axis robots so that the overall motion profiles thereof substantially match with one another.

4. The system of claim 1 or 2, wherein the transfer units and/or the multi-axis robots are controlled to travel substantially the same distances for a given step in a pick and place cycle.

5. The system of claim 1 or 2, wherein the transfer units are moved by at least two interleaved multi-axis gantry robots or at least two arm-robots.

6. The system of claim 1 or 2, wherein the control means effects independent movement of the multi-axis robot(s) with respect to all axis.

7. The system of claim 1 or 2, wherein the at least one transfer unit is moved by means of at least one linear motor within a multi-axis gantry robot.

8. The system of claim 7, wherein each of the transfer units is moved by at least one separate linear motor running on common bearing means.

9. The system of claim 1 or 2, wherein the at least one transfer unit is moved by means of linear magnetic motors generating thrust using magnetic flux means and running on bearing means, wherein one or more of the bearing means can be provided in common for the transfer unit or separately.

10. The system of claim 1 or 2, wherein the at least one transfer unit is moved by two separate linear magnetic motors generating thrust using the same magnetic flux means and running on common bearing means.

11. The system of claim 1 or 2, wherein the transfer units have access to a work surface.

12. The system of claim 1 or 2, wherein the system transfers objects and/or substances.

13. The system of claim 12, wherein the objects and/or substances are biologically, biochemically, or chemically active.

14. The system of claim 13, wherein the biologically, biochemically, or chemically active objects and/or substances are nucleic acids, analogs of nucleic acids, proteins, peptides, analogs of proteins and/or peptides, small-molecules, viruses, prokaryotic cells, or eukaryotic cells.

15. The system of claim 12, wherein each multi-axis robot has access to at least one deposition position for depositing thereon the objects and/or substances, at least one sampling position, and/or at least one cleaning unit.

16. The system of claim 15, wherein at the deposition position distinct regions of transferred objects and/or substances are arranged at densities of 1 to 100 regions per square centimeter.

17. The system of claim 1 or 2, wherein the transfer unit comprises at least one pipette, micropipetting device, pin and/or pipette array, micropipetting device array or pin array.

18. The system of claim 1 or 2, wherein each transfer unit comprises at least one grabbing means.

19. The system of claim 1 or 2, further comprising at least one separate sampling position for every transfer unit.

20. The system of claim 19, wherein the sampling are arranged physically distinct from the work surface.

21. The system of claim 19, wherein at least one sampling position comprises at least one container.

22. The system of claim 19, wherein at least one of the sampling positions comprises at least one multiwell container.

23. The system of claim 22, wherein the multiwell container is designed to be held in a multiwell container storage means accessible to the multiple axis robot(s).

24. The system of claim 1 or 2, further comprising inertial force and/or kinetic energy absorbing means.

25. The system of claim 24, wherein the inertial force and/or kinetic energy absorbing means is at least one free-moving mass connected to the multi-axis robot(s) and/or work surface in such a way, that any force acting on the multi-axis robot(s) and/or work surface also acts on the free-moving mass.

26. The system of claim 25, wherein oscillations of the free-moving mass are dampened to a sub-resonance frequency by a damping unit.

27. The system of claim 26, wherein the dampening unit comprises at least one gas, liquid and/or solid shock-absorbing unit.

28. The system of claim 27, wherein the free-moving mass is a block of concrete suspended from at least one point and oscillations of the free-moving mass are dampened by at least one damping unit.

29. The system of claim 1 or 2, located in a conditioning chamber and/or room.

30. A method for rapid pick and place operations, comprising
  (a) providing a multi-axis robot comprising at least two transfer units, and
  (b) controlling movement of the transfer units of the multi-axis robot such that inertial forces generated during acceleration and/or deceleration are substantially eliminated.

31. A method for rapid pick and place operations, comprising
  (a) providing at least two multi-axis robots, wherein each of the multi-axis robots comprises at least one transfer unit, and
  (b) controlling movement of the multi-axis robot and/or transfer units of the multi-axis robot such that inertial forces generated during acceleration and/or deceleration are substantially eliminated.

32. The method of claim 30 or 31, wherein the controlling step further comprises the step of effecting substantially simultaneous and oppositely directed movement of the transfer units and/or the multi-axis robots so that the overall motion profiles thereof substantially match with one another.

33. The method of claim 30 or 31, wherein the transfer units and/or the multi-axis robots are controlled to travel substantially the same distances for a given step in a pick and place cycle.

34. The method of claim 31, wherein the transfer units are carried by at least two interleaved multi-axis gantry robots or at least two arm-robots.

35. The method of claim 30 or 31, wherein the controlling step further comprises effecting independent movement of the multi-axis robot(s) with respect to all axes.

36. The method of claim 35, wherein the at least one transfer unit is moved by two separate linear magnetic motors generating thrust using the same magnetic flux means and running on a common bearing means.

37. The method of claim 30 or 31, wherein the at least one transfer unit is moved by at least one linear motor within a multi-axis gantry robot.

38. The method of claim 37, wherein each of the transfer units is moved by at least one separate linear motor running on a common bearing means.

39. The method of claim 30 or 31, wherein the at least one transfer unit is moved by means of linear magnetic motors generating thrust using magnetic flux means and running on bearing means, wherein one or more of the bearing means can be provided in common for the transfer unit or separately.

40. The method of claim 30 or 31, wherein the transfer units have access to a work surface.

41. The method of claim 30 or 31, wherein the system transfers objects and/or substances.

42. The method of claim 41, wherein the objects and/or substances are biologically, biochemically, or chemically active.

43. The method of claim 42, wherein the biologically, biochemically, or chemically active objects and/or substances are nucleic acids, analogs of nucleic acids, proteins, peptides, analogs of proteins and/or peptides, small-molecules, viruses, prokaryotic cells, or eukaryotic cells.

44. The method of claim 41, wherein the work surface comprises at least one deposition position for depositing thereon the objects and/or substances, at least one sampling position, and/or at least one cleaning unit.

45. The method of claim 44, wherein at the deposition position distinct regions of transferred objects and/or substances are arranged at densities of 1 to 100 regions per square centimeter.

46. The method of claim 44, wherein each deposition position is visited multiple times during the production of the arrangement, each time carrying a further sample of objects and/or substances.

47. The method of claim 30 or 31, wherein the transfer unit provides at least one pipette, micropipetting device, pin and/or pipette array, micropipetting device array or pin array.

48. The method of claim 30 or 31, wherein each transfer unit comprises at least one grabbing means.

49. The method of claim 30 or 31, further comprising providing at least one separate sampling position for every transfer unit.

50. The method of claim 49, wherein the sampling positions are arranged physically distinct from the work surface.

51. The method of claim 49, wherein at least one of the sampling positions comprises at least one container.

52. The method of claim 49, wherein at least one of the sampling positions comprises at least one multiwell container.

53. The method of claim 52, wherein the multiwell container is designed to be held in a multiwell container storage means accessible to the multi-axis robot.

54. The method of claim 30 or 31, further comprising the step of providing inertial forces and/or kinetic energy absorbing means.

55. The method of claim 54, wherein the inertial force and/or kinetic energy absorbing means provides at least one free-moving mass connected to the multi-axis robot(s) and/or work surface in such a way, that any force acting on the multi-axis robot(s) and/or work surface also acts on the free-moving mass.

56. The method of claim 55, wherein oscillations of the free-moving mass are dampened to a sub-resonance frequency by at least one damping unit.

57. The method of claim 56, wherein the dampening unit is at least one gas, liquid, and/or solid shock-absorbing unit.

58. The method of claim 57, wherein the free-moving mass is at least one block of concrete suspended from at least one point and oscillations of the free-moving mass are dampened by at least one damping unit.

59. The method of claim 30 or 31, carried out in a conditioning chamber and/or room.

60. A computer program product directly loadable with the internal memory of the a digital computer, comprising software code portions for performing the steps of a method according to claim 30 or 31, when the product is run on a computer.

61. A computer program product stored on a computer usable medium, comprising
  computer readable program means for causing a computer to control movement of a multi-axis robot comprising at least one transfer unit, and
  computer readable program means for causing the computer to control the substantially eliminating inertial forces generated during acceleration and/or deceleration.

62. Electronic distribution of a computer program product according to claim 60.

* * * * *

UNITED STATES PATENT AND TRADEMARK OFFICE
CERTIFICATE OF CORRECTION

PATENT NO. : 6,658,324 B2
DATED : December 2, 2003
INVENTOR(S) : Kettle et al.

It is certified that error appears in the above-identified patent and that said Letters Patent is hereby corrected as shown below:

<u>Column 14,</u>
Line 63, after "60" insert -- or 61 --.

Signed and Sealed this

Twenty-third Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,658,324 B2
DATED : December 2, 2003
INVENTOR(S) : David Bancroft et al.

It is certified that error appears in the above-identified patent and that said Letters Patent is hereby corrected as shown below:

<u>Column 14,</u>
Line 63, after "60" insert -- or 61 --.

This certificate supersedes Certificate of Correction issued March 23, 2004.

Signed and Sealed this

Twenty-ninth Day of March, 2005

JON W. DUDAS
*Director of the United States Patent and Trademark Office*